Nov. 8, 1966 CHI-YUAN LEE ETAL 3,284,779
ASSOCIATIVE MEMORY INCLUDING MEANS FOR RETRIEVING
ONE OF A PLURALITY OF IDENTICAL STORED WORDS
Filed April 9, 1963 2 Sheets-Sheet 1

INVENTORS C. Y. LEE
M. C. PAULL
BY
R. C. Winter
ATTORNEY

United States Patent Office 3,284,779

Patented Nov. 8, 1966

3,284,779

ASSOCIATIVE MEMORY INCLUDING MEANS FOR RETRIEVING ONE OF A PLURALITY OF IDENTICAL STORED WORDS

Chi-Yuan Lee, Red Bank, and Marvin C. Paull, Matawan, N.J., assignors to Bell Telephone Laboratories, Incorporated, New York, N.Y., a corporation of New York Filed Apr. 9, 1963, Ser. No. 271,759
6 Claims. (Cl. 340—172.5)

Figure 1:
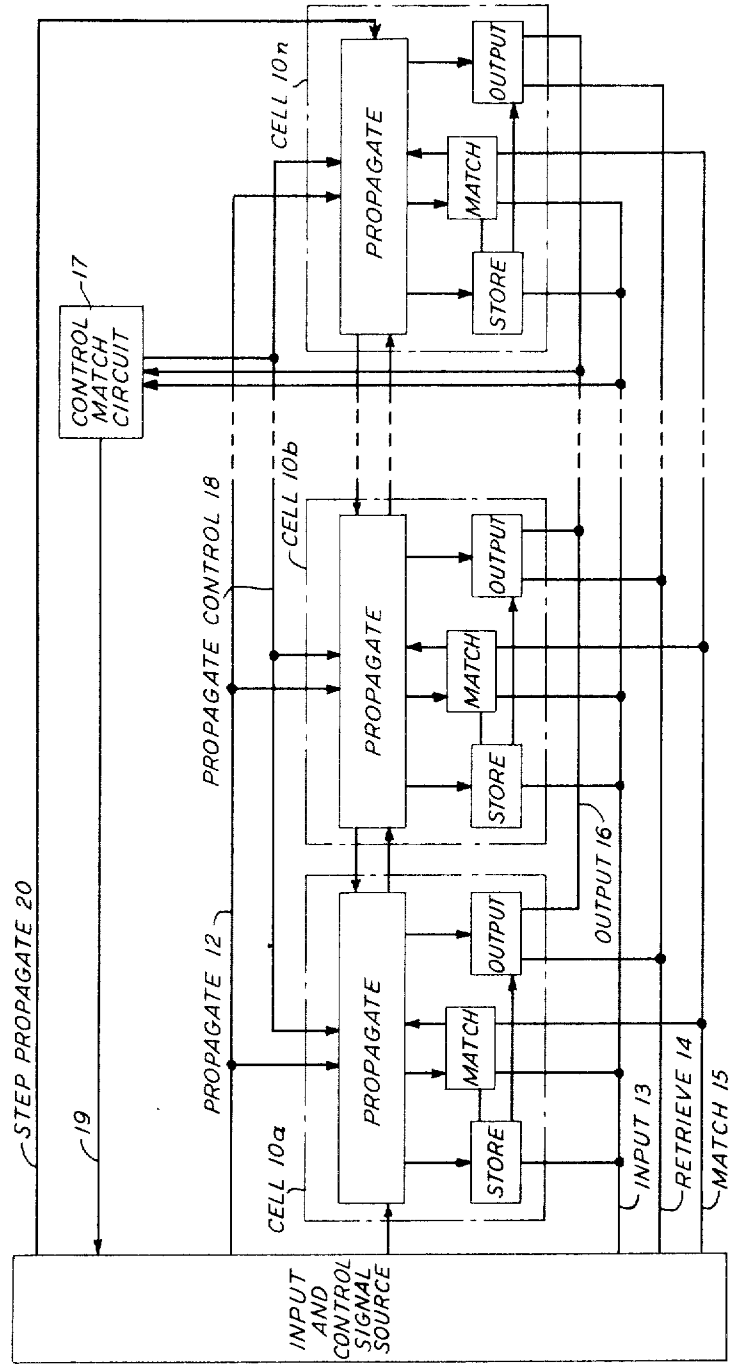

This invention relates to information storage and retrieval systems, and more particularly to such systems in which retrieval is based on content rather than location.

Memory units in current use may be divided into two broad classifications according to the manner of gaining access to the stored information. Some memory units store information at predetermined locations without regard to the particular information being stored. Retrieval is then implemented by addressing the predetermined storage location in the memory. Another type of memory, referred to as associative memory, matches or associates the stored information with retrieval data. Thus, in order to retrieve a stored symbol, a corresponding symbol is applied simultaneously to each storage cell. If a match with a stored symbol is obtained, retrieval of data associated with the matched symbol may be achieved.

An example of such an associative memory is disclosed in C. Y. Lee application Serial No. 190,856, filed April 30, 1962, now Patent 3,185,965, issued May 25, 1965. In addition to the basic storage and retrieval operations, such a system has the ability to erase data from the memory and to store new data therein irrespective of the number of symbols in a word or the number of words in the messages involved.

One problem that arises in the utilization of such a memory is concerned with the ability to retieve one of a group of identical messages stored in different locations in the memory. The memory disclosed in the aforementioned Lee application has the ability to retrieve a message by applying a group of symbols which correspond to a word stored in only one location in the memory. A group of messages stored at random locations in the memory and each containing a common word which is utilized as an address for retrieving a message from the memory would present an inoperative situation since the entire group of messages would be retrieved simultaneously without means for discriminating between the messages.

Accordingly, it is an object of this invention to improve the operation of information storage and retrieval systems.

It is another object of this invention to improve the operation of an associative type memory, and more particularly, to increase the flexibility of such systems.

It is a further object of this invention to permit storage and retrieval of messages containing duplicated data in an associative type memory.

These and other objects of the invention are realized in accordance with one specific illustrative embodiment thereof by provision of a memory unit comprising an array of structurally identical storage cells capable of storing a symbol or bit of data and communicating with adjacent cells, as disclosed in the aforementioned C. Y. Lee application.

As there described, symbols are written in the cells sequentially during the storage operation, such that a series of interconnected cells will contain identifying symbols, and a succeeding series of interconnected cells will contain data symbols. During retrieval, a symbol is applied simultaneously to each cell in the memory and serves to activate only those cells containing the corresponding symbol. The activated cells in turn prepare adjacent cells to perform the matching function with succeeding input symbols. The process continues until all of the address symbols have been applied in sequence to the memory and matched against the content of active cells.

A retrieval signal applied thereafter to each cell in the memory will trigger each currently active cell, which at this time includes only the first cell in one or more stored words or series of cells containing data symbols. Read out will continue through the successive cells in the activated words thus providing, in parallel form, all of the information identified by the particular address. Advantageously, the process may also be reversed such that the address symbols during retrieval correspond to the stored word. In this instance, upon initiation of the read out operation, the word identifier, activated by the corresponding word matching the address symbols, will be read out.

As further described in the aforementioned application, information may be retrieved from the memory on a direct basis which presumes that the application of a particular address to the memory will eventually produce an output of the data stored adjacent the last of the group of cells containing the word matching the address. When a match occurs, an advance signal is transmitted from the active cell to activate the adjacent cell. When a data cell receives such an advance signal, it reads out the stored data as well as continuing the propagation of the forward signal to succeeding cells until all of the data identified by the particular address has been retrieved.

It is also possible, through a process referred to hereinafter as cross retrieval, to retrieve a message comprising one or more stored words including the address word. In this instance the activity condition is propagated in either direction during retrieval. The cell structure again is uniform throughout the memory, but a new identifier, referred to hereinafter as a tag symbol, is stored in the memory immediately preceding each word and each message. Thus the tag symbol specifically identifies that a word or multiple word message is stored in succeeding cells, dependent upon the specific tag symbol employed. Also an external comparison circuit is provided which matches the various outputs of the memory against a particular tag symbol, and when a match is encountered in the external comparison circuit, the retrieval operation is completed.

The improvement afforded by our invention concerns a situation in which a particular word is stored at a number of locations throughout the memory as a portion of each of a number of longer messages. It may now be desired to retrieve a message or messages by utilizing this word as the address. This operation is facilitated by a step propagation operation in which the messages containing the aforementioned word are retrieved in sequence. If one of these messages is sufficient, the operation may be discontinued at that time. Otherwise, the memory will continue to retrieve the desired messages in sequence.

The circuitry necessary to perform this function in the illustrative embodiment of this invention includes propagation leads for transmitting control signals in either direction between adjacent cells in the memory. Logic circuitry is added to facilitate application of control signals to interact with a particular cell activity state and with the propagate signal to achieve the desired step propagation.

It is a feature of this invention that an information storage and retrieval system comprise circuitry for permitting the retrieval of identical messages stored at different locations in the memory.

It is another feature of this invention that apparatus be provided to permit retrieval of messages stored at different locations in the memory, each of which messages contains a word which is utilized as the address to the memory for retrieving the messages.

It is a further feature of this invention that apparatus be provided for retrieving multiple messages from the memory in sequence.

Figure 2:
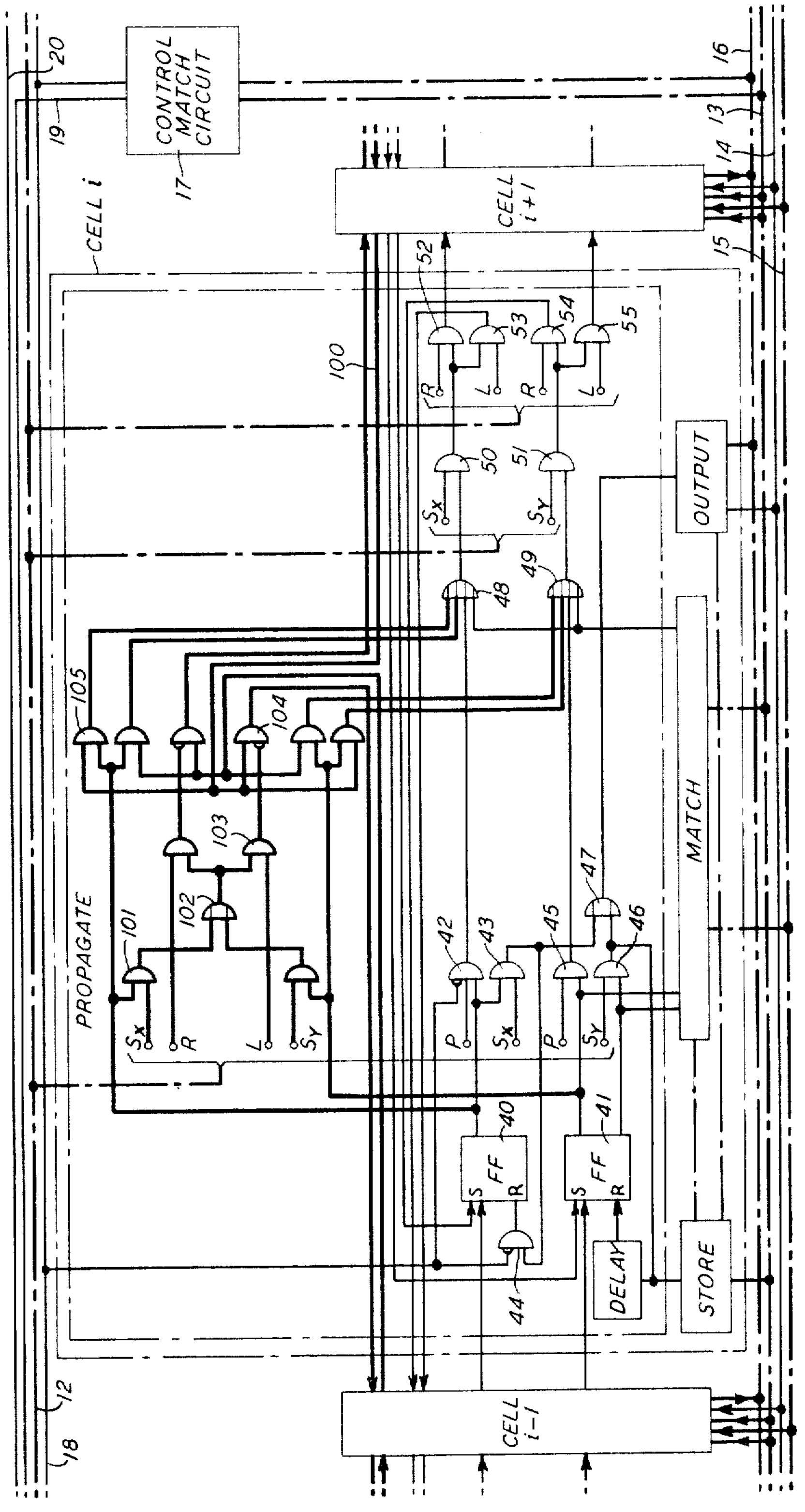

A complete understanding of this invention and of the above-noted and other features thereof may be gained from consideration of the following detailed description with reference to the accompanying drawing, in which:

FIG. 1 is a simplified block diagram representation of an associative memory as contained in the aforementioned C. Y. Lee application and suitable for illustration of this invention; and FIG. 2 is a schematic representation of one storage cell in the memory of FIG. 1 depicting in detail the circuitry required to perform the step propagation operation in accordance with the specific illustrative embodiment of this invention.

Turning now to the drawing, the basic elements of an associated memory of the type disclosed in the aforementioned C. Y. Lee application for performance of storage and retrieval operations illustrative of one specific embodiment of this invention are depicted in FIG. 1. As there shown, the memory unit comprises a plurality of storage cells 10*a*–10*n* each of which is connected to adjacent cells. Thus the arrangement forms a series network of interconnected cells, with each cell connected to the succeeding and preceding cells in the network chain.

Each cell 10*a*–10*n* contains store, match, output and propagate circuits. Signals from a master input and control signal source are supplied to each store and match circuit over leads represented by input cable 13 and match cable 15, whereupon the content of each cell 10*a*–10*n* is matched against the applied signals. When a match occurs in a particular one of the cells 10*a*–10*n*, a signal is transmitted from its propagate circuit to one of the adjacent cells. This action activates the propagate circuit in the neighboring cell, thereby placing it in condition for a possible match of its content with the next applied signal.

The direction of propagation is determined by signals present on leads represented by propagate cable 12 which also provides signals to each of the cells 10*a*–10*n*. When the matching operation is completed, the propagate signals permit activity condition signals to be propagated between adjacent interconnected cells, the direction of propagation being controlled externally.

An output cable 16, also connected to each of the cells 10*a*–10*n*, is activated by signals applied to the retrieve cable 14 after the matching operation to permit retrieval of information from those cells which were appropriately primed for retrieval by the intercell activity. A control match circuit 17 common to all cells is connected to the output cable 16 and serves to compare the outputs of the various cells 10*a*–10*n* with predetermined information symbols designating various stages of the operation, a match resulting in predetermined transitions in the cells.

The cells, although indistinguishable from one another in structural elements and their interconnections, are each arranged to store a symbol which designates the beginning or end of a message or a specific word in a message, or which actually comprises a unit of a word. When the symbol identifies a message or word, it is referred to as a tag symbol. Such tag symbols are necessary to retrieve multiple word messages from the memory when the memory receives as its address only a particular word in the message to be retrieved. In accordance with our invention, such message retrieval is possible despite the fact that the address word may appear in several of the messages stored in the memory.

Initially consider an empty network of storage cells 10*a*–10*n*. During the storage process, a plurality of symbols will be applied in sequence to the cell network over input lead 13. During the storage operation, the cells are arranged to be triggered successively by the applied symbol and by the preceding cell upon storage therein of a symbol. Thus cell 10*a* will store the first received symbol and activate cell 10*b* to receive the second applied symbol and so on until all of the applied symbols have been stored, at which point the next succeeding cell in the network will be activated to receive the first symbol of the next block of information to be stored.

Let us assume that the following information is to be applied to the empty network of cells 10*a*–10*n*:

| Position | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| Symbol | $\alpha_0$ | $\alpha_1$ | A | $\beta$ | $\alpha_2$ | B | $\beta$ | $\alpha_3$ | C | $\beta$ | $\alpha_0$ | $\alpha_1$ | D | $\beta$ | $\alpha_2$ | B | $\beta$ | $\alpha_0$ | $\alpha_1$ | B | $\beta$ | $\alpha_2$ | E | $\beta$ | $\alpha_0$ |

Each symbol represents a unique binary number stored, for example, in a plurality of flip-flop register circuits, as described in the aforementioned C. Y. Lee application. The symbol $\alpha_0$ is a tag indicating the beginning of a message; the symbols $\alpha_1$, $\alpha_2$ and $\alpha_3$ are tags indicating the beginning of distinct words; the symbol $\beta$ is a tag indicating the end of a word. The words in the three messages contained in this input information are represented by ABC, DB and BE. Each of the words is preceded by the appropriate tag $\alpha_1$, $\alpha_2$, $\alpha_3$, and succeeded by the tag $\beta$. Similarly, each message is preceded by the tag symbol $\alpha_0$.

Initially, the cells storing the corresponding symbols are each in a passive state. Of course, the words themselves may take up a number of cells, but for this illustration it will suffice to identify each word with only one cell position. Upon completion of the storage operation, the designated symbols will appear in the same sequence in the series network of storage cells 10*a*–10*n*, all of which will be placed in a passive state. Thus the network would appear as illustrated in the example, in which condition it is prepared for the matching operation, which is the first step in the retrieval of any message from the network given one of the message words.

At this point let us consider for purposes of illustration that it is desired to retrieve the multiple symbol word designated by the letter D in position 13. Since there is actually no prior knowledge as to which cells contain his word, it must be identified by applying each of its symbols and appropriate tags in sequence to all of the network cells, viz., $\alpha_1$, D, $\beta$. Initially, then, all of the cells receive the tag symbol $\alpha_1$ and are required to match their content against it. Each cell containing the $\alpha_1$ tag is arranged to transmit a signal to the succeeding cell in the network upon completion of this matching operation.

Every cell which receives a signal from an adjacent cell changes from the passive state to an active state. Thus, in the example, the cell to the right of any cell storing $\alpha_1$ is placed in the active state.

During the next match cycle all active cells, viz., positions 3, 13 and 20, will match their individual contents against the next input symbol D. D merely represents a series of symbols comprising a word which occupies a corresponding series of cells. In the example, the active cell 13 storing D represents such a series of cells containing a word. Upon completion of the matching and activity propagation operations through each cell containing the word symbols in the manner described, the last cell in the word transmits an activating signal to the succeeding cell, in this instance the cell in position 14. The last cell in the word represented by the symbol D in position 13 then restores itself to the passive state. Thus the final input symbol $\beta$ will find that the only active cell in the network is in position 14 and that this cell has stored therein the matching signal $\beta$. The match results in activation of the cell in position 15 storing $\alpha_2$, the tag symbol for the next word in the message. This completes the chain of input signals serving to locate a particular message by a single word address.

A signal now is applied to the propagate cable 12, serving to direct the active condition of the cell in position 15 to the left in the cell memory, thereby activating the cells in positions 14, 13, 12 and 11 in sequence.

The control match circuit 17, FIG. 1, contains the symbol $\alpha_0$ during this phase of the operation. It is compared with each symbol as read out of the network, and when a match occurs, the network automatically discontinues the propagate operation. At this point the complete message is ready for read out.

Signals are now applied to the propagate cable 12, serving to initiate propagation to the right through the cells in positions 12 through 17 of the example. At the same time a signal is applied to the retrieve cable 14, serving to provide tag symbol $\alpha_1$ as the initial output on output cable 16. The latter cell, in turn, transmits an activating signal to the adjacent cell and resets itself. In this fashion each symbol in the words D and B represented by cell positions 13 and 16, respectively, is read out in sequence on output cable 16. In this instance the control match circuit 17 contains the symbol $\alpha_0$ such that read out will continue until the matching operation detects the $\alpha_0$ in position 18, beginning the next stored message, at which point the operation is concluded.

It may be observed that in many instances the same word may be stored in a number of messages at various locations in the memory and that if such a common word is utilized to address the store for read out of a message, the system would have no means for identifying the desired message and would attempt to read out all of the messages containing the address word simultaneously. In accordance with our invention, this difficulty is overcome by means of a step propagation routine which serves to read out one or more of the messages containing the address word in sequence.

Consider once again the memory, as indicated in the example, containing the messages ABC, DB and BE at various distinct locations. It is noted that the B word is common to all of these messages. If it is now desired to retrieve a message from the memory utilizing the word B as the address, the retrieval routine must be modified over that described hereinbefore in order to avoid the simultaneous read out of all messages containing the word B.

This is achieved by first performing the matching and propagation operations earlier described. Upon completion of these matching and propagation operations, the cell immediately adjacent the last symbol of the word B in each appearance in the memory will be active, viz., positions 8, 18 and 22. A signal is now applied to a step propagation cable 20 which serves to apply a signal only to the cell 10*n*. The cell 10*n* in turn directs this step propagation signal through adjacent cells in the sequence until the first active cell is reached, in this instance the cell in position 22. At this point propagation is halted, but as its final operation, the active cell in position 22 propagates its activity to the adjacent cell on its left, position 21, and deactivates itself. After this operation is completed, all active cells except the cell in position 21, receiving the step propagation activity, are deactivated. Thus all active candidates for message read out except one have been eliminated.

The cross retrieval operation previously considered may now by utilized to retrieve the symbols in the message stored in positions preceding and including position 21, viz., positions 19–21. Upon completion of this operation, the memory is restored to the condition in which the cell in position 21, adjacent to the final symbol in the adress word B of this message, is the only active cell in the memory. If it is desired to retrieve additional messages containing the address word B at this time, a second routine is initiated in which a second activity condition is established in the active cell in position 21 and the initial activity condition thereof is removed. At this point the retrieval and step propagation operations may be repeated and the message previously read out will be ignored, since the matching operation will involve only those symbols which do not display the second activity condition.

A typical storage cell construction for performing the above operations in the network in accordance with one illustrative embodiment of this invention is shown in FIG. 2. As there depicted, the cell comprises store, match and output circuitry of the type disclosed in the aforementioned C. Y. Lee application, together with a plurality of logic circuits well known in the art including AND and OR gates, shown with heavier outlines, added to the propagate circuit of the aforementioned Lee application.

Assume that a step propagation signal is originated at the final cell in the memory and that the leads $S_X$ and L are active. The signal is propagated from cell to cell to the left in the network until the first cell having flip-flop 40 in the propagate circuit active is reached. It will be assumed that the cell illustrated in FIG. 2 is this first X active cell that the step propagate signal will encounter as it propagates to the left through the cell network.

The $S_X$ signal, together with the set condition of flip-flop 40, activates AND gate 101, the output of which is transmitted through OR gate 102 and together with the propagate left L signal, activates AND gate 103 to apply a signal at the inhibit input of gate 104. The step propagate signal is received from cell $i+1$ on lead 100 and is blocked at gate 104 by the inhibit signal so that propagation is halted at cell $i$.

The set output of flip-flop 40 is also applied, together with the step propagation signal on lead 100, to AND gate 105, which in turn provides its output through OR gate 48 to AND gate 50. AND gate 50 is activated by this signal in conjunction with the $S_X$ signal and provides an output which activates AND gate 53 in conjunction with the propagate left L signal, serving to activate the X active flip-flop corresponding to flip-flop 40 in cell $i-1$. Thus the left step propagation signal causes the first active cell that it encounters in the serially connected chain of cells of the memory (and only this cell) to propagate its activity to the adjacent cell on its left and inhibit further propagation. Advantageously, similar structure may be provided in each cell to support step propagation in the opposite direction.

To illustrate this form of step propagation, the example set forth hereinbefore may again be consulted. The initial matching operation which reveals a plurality of messages stored in the memory, each of which contains the word B utilized to address the memory in order to retrieve a message containing this word, places the memory in a condition in which the cells in positions 8, 18 and 22 are active. The left step propagation action is then initiated and since cell position 22 will be the first active cell to receive the step propagation signal, it will inhibit further propagation and will activate the cell in position 21. The network then receives a command which results in the deactivation of all cells other than the cell in position 21. Thus all but one of the candidates for message retrieval have been eliminated.

If it is desired to retrieve more than one of these messages, the left step propagation activity is repeated after retrieval of the first message. However, in this instance, the X activity which previously existed in cell position 22 of the example is changed to a Y activity in the manner set forth in the aforementioned C. Y. Lee application, the Y activity being indicated by the set condition of flip-flop 41, FIG. 2. Thus during the ensuing left step propagation operation cell *i*, being Y active rather than X active, will fail to stop the signal on lead 100 at gate 104, and it will proceed to cell $i-1$. The propagation in this instance continues until the next X active cell, viz., that in position 18 of the example, has been reached.

It is to be understood that the above-described arrangement is illustrative of the application of the principles of the invention. Numerous other arrangements may be devised by those skilled in the art without departing from the spirit and scope of the invention.

What is claimed is:

1. A memory comprising a plurality of cells connected in series, means for storing a distinct data symbol in a randomly located plurality of said cells interspersed among cells storing other data symbols, and means for retrieving said distinct data symbol from a single one of said randomly located plurality of cells comprising means in each cell for comparing the stored data symbol with a comparison signal applied simultaneously to each of said cells, means responsive to a match in one cell for activating another cell, means for applying a propagate signal to a predetermined one of said cells, means in each cell for transmitting said propagate signal through adjacent inactive cells, means for deactivating all cells other than the active cell receiving the propagate signal, and means in said remaining active cell responsive to the simultaneous application of a retrieval signal to each of said cells for reading out the stored data symbol.

2. A memory in accordance with claim 1 and further comprising means for retrieving said distinct data symbol from the other storage locations in the memory in sequence.

3. An associative retrieval memory comprising a plurality of storage cells, means for storing a distinct symbol in each cell, a sequence of stored symbols forming a word, means in each of said cells for comparing a stored symbol with an address symbol applied simultaneously to each of said cells, and means for retrieving a distinct one of a plurality of identical words stored at random locations in said memory upon application of said identical word as the address to said memory, said retrieving means comprising means for applying a signal to a terminal cell in said memory, means for propagating said signal from said terminal cell through the memory cells in sequence, and means for inhibiting further propagation of said signal at the first cell of a sequence of cells containing one of said identical words encountered by said signal.

4. An associative retrieval memory in accordance with claim 3 wherein said retrieving means further comprises means in said first cell for activating the adjacent cell in the sequence, and means for deactivating all cells in said memory other than said adjacent cell.

5. An associative retrieval memory comprising means for storing multiple word messages at random locations in said memory, each of a plurality of said messages containing a first word, means for addressing said memory with said first word, means responsive to receipt of said address for activating the cell in the position immediately succeeding each location of said first word in said memory, said retrieving means comprising means for applying a signal to a terminal cell in said memory, means for propagating said signal from said terminal cell through the series of memory cells in sequence, and means for inhibiting further propagation of said signal at the first active cell encountered by said signal.

6. An associative retrieval memory in accordance with claim 5 wherein said retrieving means further comprises means in said first active cell for activating the adjacent cell in said series of memory cells and means for deactivating all cells in said memory other than said adjacent cell.

References Cited by the Examiner

UNITED STATES PATENTS

| | | | |
|---|---|---|---|
| 2,973,508 | 2/1961 | Chadurjian | 340—174 |
| 3,185,965 | 2/1965 | Lee | 340—172.5 |
| 3,191,155 | 6/1965 | Seeber et al. | 340—172.5 |
| 3,191,156 | 6/1965 | Roth | 340—172.5 |
| 3,195,109 | 7/1965 | Behnke | 340—172.5 |
| 3,221,158 | 11/1965 | Roth et al. | 340—172.5 |
| 3,229,255 | 1/1966 | Anderson | 340—172.5 |

OTHER REFERENCES

Kiseda et al., "A Magnetic Associative Memory," I.B.M. Journal, April, 1961 (pages 106–121 relied on, copy in Group 240).

ROBERT C. BAILEY, *Primary Examiner.*

P. J. HENON, *Assistant Examiner.*